United States Patent [19]

Dorsey

[11] 4,398,791

[45] Aug. 16, 1983

[54] SINGLE CHANNEL OPTICAL SLIP RING

[75] Inventor: Glenn F. Dorsey, Blacksburg, Va.

[73] Assignee: Litton Systems, Inc., Blacksburg, Va.

[21] Appl. No.: 233,002

[22] Filed: Feb. 9, 1981

Related U.S. Application Data

[63] Continuation-in-part of Ser. No. 204,762, Nov. 7, 1980, abandoned.

[51] Int. Cl.³ ............................................. G02B 5/14
[52] U.S. Cl. .............................. 350/96.18; 350/96.20
[58] Field of Search ............... 350/96.18, 96.20, 96.31; 250/227, 551

[56] References Cited

U.S. PATENT DOCUMENTS

| 3,829,195 | 8/1974 | Rawson | 350/96.18 |
| 3,922,063 | 11/1975 | Marrone | 350/56 |
| 4,027,945 | 6/1977 | Iverson | 350/56 |
| 4,178,515 | 12/1979 | Tarasevich | 250/551 |
| 4,265,511 | 5/1981 | Nicia et al. | 350/96.18 |

FOREIGN PATENT DOCUMENTS 2029046  3/1980  United Kingdom ............. 350/96.18

*Primary Examiner*—David K. Moore
*Attorney, Agent, or Firm*—Brian L. Ribando

[57] ABSTRACT

A single channel optical slip ring assembly comprising first and second optic fibers, a first lens optically coupled to one end of the first optic fiber for collimating a light signal into a parallel light beam having a selected diameter substantially larger than the first and second optic fiber, a second lens optically coupled to one end of the second optic fiber for focusing a collimated light beam having the selected larger diameter into the second fiber end, and means for rotatably mounting the first lens to the second lens so that the lenses are axially aligned along the axis of rotation and are separated by a selected gap for axially transmitting a collimated light signal therebetween whereby the first and second fibers are optically coupled during relative rotation.

1 Claim, 2 Drawing Figures

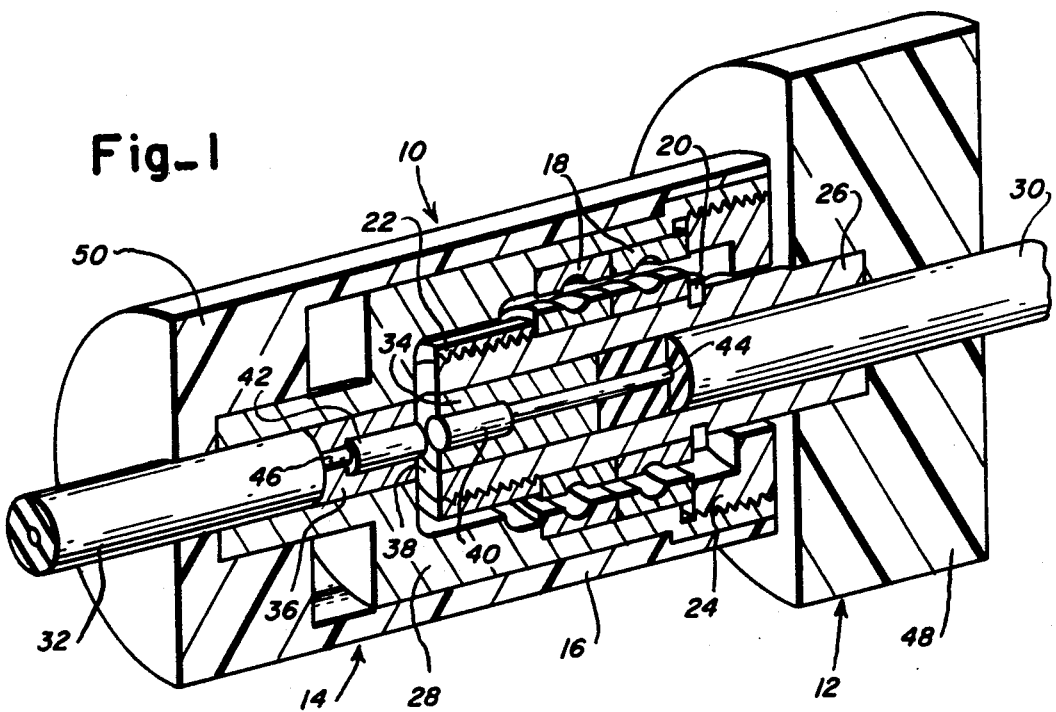
Fig_1
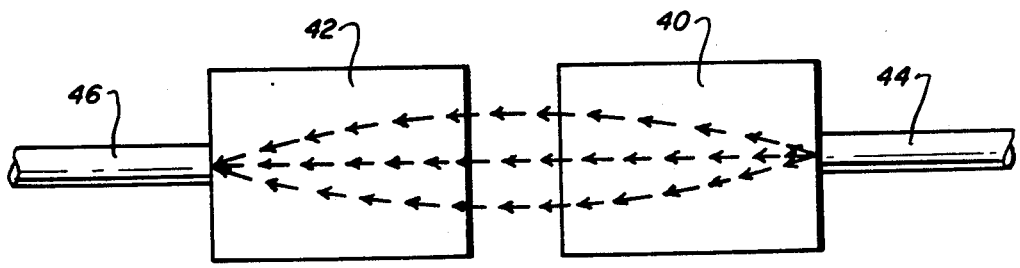
Fig_2

SINGLE CHANNEL OPTICAL SLIP RING

This is a continuation in part of my copending application Ser. No. 204,762 filed on Nov. 7, 1980 and now abandoned.

The present invention relates to single channel optical slip rings.

It is well known to optically couple two fixed fiber optic cables, each having a single optic fiber, by maintaining the ends of the fibers proximate and in axial alignment. It would be highly advantageous to provide an optical joint which would allow for relative rotation between two cables.

An object of this invention is to provide a single channel fiber optic rotary joint.

Other objects and advantages of the present invention will become apparent from the following portion of this specification and from the accompanying drawing which illustrates, in accordance with the mandate of the patent statutes, a presently preferred embodiment incorporating the principles of the invention.

FIG. 1 is a perspective view in partial section of a single channel fiber optic rotary joint according to the teachings of the present invention, and FIG. 2 is a schematic view of the optical coupling of the rotary joint of FIG. 1.

The fiber optic rotary joint or optical slip ring 10 generally includes a rotor assembly 12 and a stator assembly 14 for maintaining two fiber optic cables axially aligned during relative rotation thereof. The rotor assembly 12 is mounted within an axially extending collar 16 of the stator assembly 14 by a pair of pre-loaded bearings 18 which are secured to the rotor by a retaining ring 20 and associated nut 22 and which are maintained with the stator collar 16 by a second bearing nut 24.

The rotor includes a shaft 26 and the stator includes a cylindrical member 28 each having an axial bore for receiving fiber optic cables 30 and 32 therein. Stainless steel bushings 34 and 36 are mounted within the respective adjacent ends of the rotor and stator bores and are separated by a selected gap 38. Flushly mounted in the adjacent ends of the bushings 34 and 36 are graded index rod lenses 40 and 42, respectively.

The rotor fiber optic cable 30 is secured with an adhesive or other conventional means in the rotor bore and has an exposed length of optic fiber 44 which extends into a rotor bushing axial bore and abuts the rotor lens 40. The stator fiber optic cable 32 is secured in the stator bore and has an exposed length of optic fiber 46 extending into a stator bushing axial bore which abuts the stator lens 42. In the preferred embodiment, a drop of optical cement is interposed between the respective fiber ends and lenses to prevent separation.

As can be seen in FIG. 2, the focal lengths of the lenses are selected so that the rotor lens 40 collimates a light signal emitted from the rotor optic fiber 44 into a parallel beam or column of light axially directed at the stator lens 42. The stator lens picks up the collimated beam and focuses it into the end of the stator fiber 46.

In the preferred embodiment, graded rod index lenses having a 1–2 mm diameter, commercially sold under the trademark SELFOC®, are employed to couple commercially available optic fibers typically 0.068–0.400 mm in diameter. The opposing lens faces in the rotary optical coupling create an emission and pick up area which is substantially greater than the diameter of the optic fibers. An axial misalignment of 1 mm of the lenses 40 and 42 results in significantly less signal cut-off than would the same axial misalignment of the bare fiber ends. Moreover, the collimation of the optical signal within the rotary joint permits the lens gap to be significantly larger than the gap between fibers in a direct fiber-to-fiber rotary joint for sustaining comparable optical coupling transmission. Preferably, the lens gap is less than one-tenth of an inch which is a much greater range than the 1 mil tolerance preferred for the fiber end gap of the fiber-to-fiber rotary optical joint disclosed in my copending application Ser. No. 204,762.

In the preferred embodiment, the rotor assembly includes a flanged end 48 which provides a suitable mounting base and the stator assembly includes a plastic sheath 50.

What is claimed is:

1. A single channel optical slip ring assembly comprising:

a hollow rotor shaft having one end of a rotor optic fiber mounted therein, a rotor graded index rod lens axially mounted in one end of said rotor shaft and optically coupled to said rotor optic fiber, said rotor lens having a selected focal length for collimating a light signal emitted from said rotor optic fiber into a parallel light beam having a diameter substantially greater than the diameter of said optic fiber, a stator cylindrical member having one end of a stator optic fiber mounted therein, and having on one end an axially extending collar, a stator graded index rod lens mounted axially within said stator proximate said collar and optically coupled to said stator optic fiber, said stator lens having a selected focal length for focusing a collimated light beam into the end of said stator fiber, means for rotatably mounting said lens end of said rotor shaft within said collar of said stator cylindrical member so that said rotor lens and said stator lens are axially aligned along the axis of rotation and said lenses are separated by a selected gap, thereby optically coupling said optic fibers during relative rotation.

* * * * *